UNITED STATES PATENT OFFICE 2,036,661

SEPARATION OF 1,8- AND 1,5-NAPHTHYL-AMINE-SULPHONIC ACIDS

John M. Tinker, South Milwaukee, Wis., assignor to E. I. du Pont de Nemours & Company, Wilmington, Del., a corporation of Delaware No Drawing. Application February 23, 1934, Serial No. 712,487. In Great Britain September 8, 1931

5 Claims. (Cl. 260—129)

This application is a continuation in part of my application Ser. No. 154,043, filed December 10, 1926.

This invention relates to a method for the separation of 1-naphthylamine-8-sulphonic acid from its isomers and more particularly to the separation of 1-naphthylamine-8-sulphonic acid from the naphthylamine-sulphonic acid mixture, containing 1-naphthylamine-8-sulphonic acid and its isomers, which is ordinarily obtained by the nitration and reduction of alpha-naphthalene-sulphonic acid.

The ordinary method of sulphonating and nitrating naphthalene and reducing the nitro body constitutes a well-known method for the production of a mixture of 1-naphthylamine-8- and 5-sulphonic acids, containing minor quantities of other isomers, which are present as impurities. The separation of 1-naphthylamine-8-sulphonic acid from the isomers, as given in the literature, is accomplished only by repeated crystallizations of their salts, in which the separation is not complete, thus necessitating repeated purifications before the products are of the required purity.

I have now found that a clean separation of the 1-naphthylamine-8-sulphonic acid from its isomers as contained in the naphthylamine-sulphonic acid mass, can be obtained by precipitating the 1,8 isomer as the free acid while leaving the other isomers in the form of their much more soluble ammonium, alkali or alkaline earth metal salts. If for this purpose a strong mineral acid is used without some material which acts in the capacity of a buffer, the slightest excess over the amount theoretically necessary to precipitate the weaker 1-naphthylamine-8-sulphonic acid results in the precipitation of some of the 1,5 isomers. On the other hand, if less than the exact quantity of strong mineral acid is used, some of the 1-naphthylamine-8-sulphonic acid remains in solution in the form of its soluble ammonium, alkali-metal or alkaline earth metal salt, and on further acidification to precipitate the 1,5 isomer, it is contaminated with the 1,8 which remains. I have, however, found that by using a weak acid, or acid reacting substance, which is of a stronger acid character than 1-naphthylamine-8-sulphonic acid, but of a weaker acid character than the other isomeric naphthylamine sulphonic acids, a quantitative separation of the free acid of the 1-naphthylamine-8-sulphonic acid can be obtained from a solution of the mixture of soluble ammonium, alkali or alkaline earth metal salts of the isomeric naphthylamine sulphonic acids. The expression, acid reacting substance, is used to include weak acids or acid salts such as sodium bisulphite, also strong mineral acids in combination with substances which by their buffer action maintain the acidity of the solution between those of the two isomeric naphthylamine sulphonic acids to be separated. These buffering materials may be added or formed in the solution by the use of weak acids which react with the metallic ions of the salts of the sulphonic acids to be separated.

The acidity (hydrogen ion concentration) of the solution may be determined by the known methods, that is, with indicators or electrolytically, and it will be apparent to those skilled in the art that many substances not specifically mentioned herein can be used, it being only necessary to determine their acidity in the presence of the naphthylamine sulphonic acids to be separated. The kind and amounts of the materials to be used may also be determined by calculation where the ionization constants of the components in the system are known.

Without limiting my invention to any particular procedure, the following examples are given to more fully illustrate my invention.

Example 1

One liter of a hot neutral (to Congo red) solution of the 1-naphthylamine-sulphonic acids containing approximately 50 grams of 1-naphthylamine-5 and 8-sulphonic acids and small quantities of the other isomeric naphthylamine sulphonic acids in the form of their soluble ammonium salts, is treated with 20 grams of sodium bisulphite. On cooling the mixture, a quantitative precipitation of the insoluble 1-naphthylamine-8-sulphonic acid in the form of its free acid is obtained, while all of the 1-naphthylamine-5-sulphonic acid and the other isomeric acids remain in solution in the form of their soluble salts. The precipitated 1-naphthylamine-8-sulphonic acid, known as Peri or Schoellkopf acid, may be filtered and washed to give a very pure product. On acidifying the mother liquor with excess mineral acids, the 1-naphthylamine-5-sulphonic acid, known as Laurent's acid, mixed with a small quantity of the 1-naphthylamine-6 and 7-sulphonic acids, known as Cleve's acids, is precipitated as the free acid.

Example 2

To a neutral (to brilliant yellow) solution obtained by sulphonating 250 parts of naphthalene, nitrating, liming, reducing, sodiating, filtering and evaporating to a sp. gr., while hot, of 1.04 in known manner for the production of 1,5- and 1,8-naphthylamine sulphonic acids, are added 190 parts of 20° Bé. hydrochloric acid and 150 parts of a 35% solution of sodium bisulphite, stirred over night, filtered and washed. 178 parts of 1-naphthylamine-8-sulphonic acid are obtained. To the mother liquor are added 300 parts of 20° Bé. hydrochloric acid. After stirring for some time the mass is filtered and the cake washed and dried. 79 grams of 1,5-napthylamine sulpho acid are obtained.

When the alkali-metal salts are used, care must be exercised not to build up the alkali-metal ion to a point where it will salt out the somewhat difficultly soluble alkali-metal salt of the 1,8 isomer.

*Example 3*

A solution of the magnesium salts of the mixed naphthylamine-sulphonic acids consisting mainly of the 1,8 and 1,5-isomers formed by alpha-sulphonating napthalene, nitrating, liming, reducing and freeing from iron with magnesium oxide in the known manner, is treated as follows: 1000 parts of this neutral solution, containing 55 parts of total amines are warmed to 60°–70° C. and 14 parts of 36.5% hydrochloric acid and 25 parts of 10% acetic acid are added. After stirring for several hours until the temperature drops to 35° C., the mass is filtered and the cake washed well with water. The dried cake, weighing 26 parts, is found by test to be the free acid of the 1-naphthylamine-8-sulphonic acid containing less than 1% of the 1,5 isomer. The filtrate is made distinctly acid to Congo red paper, and after standing, the Laurent's acid is filtered and washed. Its dry weight is 6.5 parts and tests show it to be practically free from the 1,8 isomer.

*Example 4*

1000 parts of a solution similar to the one used in Example 3 are treated with 30 parts of 10% sulphuric acid and 3.4 parts of tartaric acid crystals. Due to the presence of the buffer (magnesium tartrate), the change in hydrogen ion concentration due to varying amounts of the sulphuric acid used is not rapid.

In filtering as under Example 3, the cake is found to be the pure free acid of Peri. The Laurent's acid obtained by acidification is also pure Laurent's acid free from Peri acid.

*Example 5*

1000 parts of a solution obtained by dissolving 25 parts of Peri acid and 7 parts of Laurent's acid with excess ammonia at 60–70° C. are neutralized with sulphuric acid (neutral to brilliant yellow). 9.0 parts of 10% hydrochloric acid and 3 parts of oxalic acid are added. After cooling to 35° C., the precipitate is filtered and washed. A few grams of this cake are tested for the presence of the 1,5 isomer by slurrying cold with excess caustic soda solution, filtering, and adding excess hydrochloric acid to the filtrate. No precipitate formed shows the cake to be free of Laurent's acid. The Laurent's acid is isolated from the Peri cake by acidifying and filtering. A sample of this cake is found to be completely soluble in excess caustic soda, showing it to be free of the Peri acid.

*Example 6*

1000 parts of a neutral (to brilliant yellow) solution containing 25 parts of Peri acid and 7 parts of Laurent's acid as their ammonium salts are treated with 14 parts of 36.5% hydrochloric acid and 5 parts of dehydrated boric acid, and agitated for several hours. On filtering, the precipitate which is formed is found to be free Peri acid free from Laurent's. A sample of the cake is soluble in concentrated ammonia and insoluble in an excess of cold caustic soda solution. A sample converted to the sultone by known methods gives a normal yield of sultone. The mother liquor is acidified until it is acid to metanil yellow indicator, filtered and washed. This cake gives no indications of sultone formation when the diazo is heated with sulphuric acid.

*Example 7*

The mixed free acids of Peri and Laurent's obtained by acidifying to Congo red, filtering and washing 1000 parts of the solution described in Example 3, were suspended in 1000 parts of warm water. 5 parts of sodium citrate and 7 parts of 10% caustic soda solution were then added and stirred for several hours. The cake obtained by filtering the above solution was free Peri acid and from the mother liquor the Laurent's acid was obtained substantially free of Peri acid by complete acidification.

As will be apparent from Example 7, the separation of these two isomers may be effected from an aqueous suspension of the free acids by adding a substance which will bring the acidity of the solution to a point between the acidities of the two isomers, in the presence of a buffer, this being considered the equivalent of the procedure outlined in other examples. The separation is dependent only on the acidity of the mass at the time of separation; the buffer material being essential to effect a clean separation without it being necessary to exercise undue care in adding either a strong acid to an alkaline solution or an alkali to the free acids.

Various other buffer salts can be employed or formed in the solution to accomplish the same results as above described.

It will be understood that instead of introducing sodium bisulphite as such into the solution, its equivalent of acid sulphite radicals may be produced in the solution, as by the introduction of sulphur dioxide, either with or without the addition of an acid, and providing the other conditions necessary for the formation of bisulphite radicals in the solution. The important feature of my invention is to carry out the separation by a precipitation of the 1-naphthylamine-8-sulphonic acid in the presence of a sufficient quantity of an acid reacting substance which is of a stronger acid character than the 1-naphthylamine-8-sulphonic acid, but of a weaker acid character than the other isomeric naphthylamine sulphonic acids.

I am aware that numerous details of the process may be varied without departing from the spirit of my invention, or the scope of the appended claims.

I claim as my invention:

1. The method of separating 1-naphthylamine-8-sulphonic acid from a solution containing principally 1-naphthylamine-8- and 5-sulphonic acids and minor quantities of isomeric acids, which comprises effecting the precipitation of 1-naphthylamine-8-sulphonic acid from the solution of the other isomeric acids in the form of their soluble salts by means of dissolved bisulphites without precipitating the isomeric acids.

2. The method of separating 1-naphthylamine-8-sulphonic acid from a solution containing 1-naphthylamine-8-sulphonic acid and its isomers in the form of their soluble salts, which comprises forming sufficient acid sulphite radicals in the solution to precipitate the 1-naphthylamine-8-sulphonic acid without precipitating the isomeric acids.

3. The method of separating 1-naphthylamine-8-sulphonic acid from a mixture of 1-naphthylamine-8-sulphonic acid and its isomers in the form of their soluble ammonium salts, which comprises adding to the solution mixture sufficient alkali-metal bisulphite to precipitate the 1-naphthylamine-8-sulphonic acid without precipitating the isomeric acids.

4. In the separation of 1,8-naphthylamine-sulphonic acid from a soluble salt of 1,5-naphthylamine-sulphonic acid, a process which comprises the precipitation of 1,8-naphthylamine-sulphonic acid in an acid solution in the presence of a bisulphite.

5. The method of separating 1-naphthylamine-8-sulphonic acid from a solution containing 1-naphthylamine-8-sulphonic acid and its isomers in the form of their soluble salts which comprises precipitating the 1,8 acid and separating said precipitated acid from the isomeric acids in the presence of a sufficient quantity of acid sulphite radicals to maintain the solution stronger in acid character than the 1,8 acid but of weaker acid character than the isomeric naphthylamine sulphonic acids.

JOHN M. TINKER.